(12) United States Patent
Klein et al.

(10) Patent No.: US 11,851,211 B2
(45) Date of Patent: Dec. 26, 2023

(54) EXPENDABLE AIRBORNE FIBER OPTIC LINK

(71) Applicant: Sanmina Corporation

(72) Inventors: Max Edward Klein, Huntsville, AL (US); David Porter, Huntsville, AL (US); Walter Thomas Castleberry, Hampton Cove, AL (US)

(73) Assignee: Sanmina Corporation, San Jose, CA (US)

( * ) Notice: Subject to any disclaimer, the term of this patent is extended or adjusted under 35 U.S.C. 154(b) by 133 days.

(21) Appl. No.: 17/511,509

(22) Filed: Oct. 26, 2021

(65) Prior Publication Data
US 2022/0234758 A1 Jul. 28, 2022

Related U.S. Application Data

(60) Provisional application No. 63/105,364, filed on Oct. 26, 2020.

(51) Int. Cl.
| | |
|---|---|
| *B64F 1/36* | (2017.01) |
| *G02B 6/44* | (2006.01) |
| *G02B 6/42* | (2006.01) |
| *B64C 39/02* | (2023.01) |
| *H04B 10/25* | (2013.01) |
| *H04B 10/80* | (2013.01) |
| *B64U 50/34* | (2023.01) |
| *B64U 30/20* | (2023.01) |

(52) U.S. Cl.
CPC ............ *B64F 1/362* (2013.01); *B64C 39/024* (2013.01); *B64U 50/34* (2023.01); *G02B 6/4292* (2013.01); *G02B 6/4477* (2013.01); *H04B 10/25* (2013.01); *H04B 10/807* (2013.01); *B64U 30/20* (2023.01); *B64U 2201/20* (2023.01); *B64U 2201/202* (2023.01); *G02B 6/4457* (2013.01)

(58) Field of Classification Search
CPC ... B64C 39/024; B64C 39/022; G02B 6/4477; B64U 2201/202; H04B 10/807
See application file for complete search history.

(56) References Cited

U.S. PATENT DOCUMENTS

| | | | |
|---|---|---|---|
| 2015/0256034 A1* | 9/2015 | Stone | G02B 6/3604 307/9.1 |
| 2020/0189731 A1* | 6/2020 | Mistry | B64F 3/02 |
| 2020/0225684 A1* | 7/2020 | Anderson | G05D 1/104 |
| 2020/0369408 A1* | 11/2020 | Dolata | B64C 39/022 |

* cited by examiner

*Primary Examiner* — Richard G Davis
(74) *Attorney, Agent, or Firm* — Heidi Eisenhut; LOZA & LOZA, LLP

(57) ABSTRACT

Aspects of the present disclosure are related unmanned aerial vehicles tethered to ground stations with an expendable airborne fiber-optic link. The tethers may be fiber-optic cables that can be used as a communications conduit between a ground station and a UAV for providing vehicle positioning/control information to the UAV as well as transmitting a large amount of information/data to the UAV. As the information being transmitted between to the UAV the ground station is critical, fiber-optic cables provide the bandwidth and transmission capabilities required with the added benefit of electromagnetic interference (EMI) and radio-frequency interference (RFI) immunity, making this an ideal solution for these applications.

18 Claims, 10 Drawing Sheets

EXPENDABLE AIRBORNE FIBER OPTIC LINK

CLAIM OF PRIORITY

This application claims priority to and the benefit of provisional patent application No. 63/105,364, filed in the United States Patent and Trademark Office on Oct. 26, 2021, the entire content of which is incorporated herein by reference as if fully set forth below in its entirety and for all applicable purposes.

FIELD

Various features relate to unmanned aerial vehicles, and more specifically to unmanned aerial vehicles tethered to a ground station with an expendable airborne fiber-optic link.

BACKGROUND

Tethered unmanned aerial vehicle systems, such as drone systems, use a permanent physical link, in the form of a flexible wire or cable, to provide power and communications to an unmanned aerial vehicle (UAV) in the system. The tethered UAVs are typically used in situations where the time required for the UAV to be airborne is greater than that of untethered drones and where only a minimal operating area is needed.

The most prolific use of fiber-optics with drones is currently with tethered platforms. These tethers generally include power (via copper cabling), fiber-optics for data communications, and a strength member to help hold the drone in place and reduce the strain on the fiber and copper. In these applications, generally a winch is used on the ground with a take-up spool, allowing the tether to be deployed as the airborne platform ascends, and retracted as the airborne platform descends. These tethers are not generally able to be used on platforms that substantially maneuver or travel lateral/longitudinal distances due to the relatively heavy cable weight and relatively short cable length but are rather common on nearly stationary platforms. These tethers are reusable, but generally short in length (typically hundreds of feet) and heavy compared to bare buffered fiber.

One prior usage of fiber-optics in unmanned aerial vehicles is the Raytheon MGM-157 EFOGM which was a long-range enhanced fiber-optic guided missile developed for the U.S. Army during the 1980s and 1990s to test the use of fiber-optics in missiles. The missile was launched vertically and manually controlled by an operator on the ground by use of a television camera mounted on the nose.

While the Raytheon MGM-157 EFOGM utilized an expendable fiber, as the missile itself was expendable; however, due to the relatively small amount of maneuvering, relatively constant velocity in-flight, and short duration of flight, the fiber-optic cable was able to be freely dispensed throughout the duration of operation without the need to carefully control the tension on the fiber-optic cable during flight or be concerned as to weight.

Current drone-based tethers are short range and heavy, which limits their application and does not allow for substantial maneuvering or movement of the airborne platform. Additionally, a winch is required to spool the fiber-optic cable in and out from the ground to the airborne platform. The spool of fiber-optic cable is maintained on the ground to reduce the amount of weight that the airborne platform must carry. However, this creates the unfortunate side-effect of the fiber-optic cable needing to be pulled from the ground-based spool and winch, and possibly dragged through the terrain if the airborne platform moves translationally away from the ground connection point.

Other expendable fiber-optic dispensers are available that allow the fiber-optic cable to be freely pulled from the spool, which is inexpensive and cost effective, however, the flight profile must be continuously accelerating, at a fixed speed without significant deceleration, or the flight duration is relatively short, where the fiber-optic cable can be paying out continuously at speed without running out of length.

Due to the increased duration in the air needed for UAVs, as well as the increased distance with which UAVs need to travel, a system and method for using a lightweight fiber-optic cable that overcomes the problems described above is needed.

SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one aspect, an unmanned aerial vehicle (UAV) system, the UAV system is provided. The UAV system comprises an expendable airborne fiber-optic link; a UAV connected to a distal end of the expendable fiber-optic link; and a fixed ground station connected to a proximal end of the expendable fiber-optic link. The fixed ground station comprises a power source for providing power to the UAV via the expendable airborne fiber-optic link; a processing system configured to perform executable operational and application specific pre-programmed commands and instructions; an electro-optic converter connected to the power source and the processing system; and a strain relief module connected to the expendable airborne fiber-optic link for preventing damage from an axially applied load and strain at a connection point to the electro-optic converter.

According to one feature, the strain relief module may be a mandrel used to wrap the expendable airborne fiber-optic link around.

According to another feature, the strain relief module may a section of the expendable airborne fiber-optic link adhered to a stationary fixture on the fixed ground station.

According to another feature, the strain relief module may a clamping mechanism radially encircling the expendable airborne fiber-optic link.

According to another feature, the unmanned aerial vehicle (UAV) system further comprises a second electro-optic converter located on the distal end of the expendable airborne fiber-optic link.

According to another feature, the distal end of the expendable airborne fiber-optic link is detachable from the UAV for transitioning to a battery powered free flight.

According to another feature, the UAV system may further comprise a second UAV connected to the first UAV by a second fiber-optic link.

According to another feature, the UAV system may further comprise a first fiber-optic dispenser connected to a proximal end of the second fiber-optic link; and a second fiber-optic dispenser connected to a distal end of the second fiber-optic link.

According to another aspect, an unmanned aerial vehicle (UAV) system is provided. The unmanned aerial vehicle system comprises a first expendable fiber-optic link; a first UAV connected to a distal end of the expendable fiber-optic link; and a mobile ground station connected to a proximal end of the first expendable fiber-optic link. The mobile ground station comprises a power source for providing power to the UAV via the expendable fiber-optic link; a processing system configured to perform executable operational and application specific pre-programmed commands and instructions; an electro-optic converter connected to the power source and the processing system; and a tension setting module connected to the electro-optic converter for controlling tension of the expendable fiber-optic link. The unmanned aerial vehicle (UAV) system further comprises a first fiber-optic dispenser connected to the proximal end of the first expendable fiber-optic link.

According to one feature, a second fiber-optic dispenser connected between the first fiber-optic dispenser and the UAV.

According to one feature, the UAV system further comprises a second UAV connected to the first UAV by a second expendable fiber-optic cable; a third fiber-optic dispenser connected to a proximal end of the second expendable fiber-optic cable; and a fourth fiber-optic dispenser connected to a distal end of the second expendable fiber-optic cable.

According to one feature, the first fiber optic dispenser is selected from an inside-payout dispenser with a tension brake, an outside-linear payout with a tension brake, and an outside-liner payout with an electrically controllable brake.

According to one feature, the second fiber optic dispenser is selected from an inside- payout dispenser with a tension brake, an outside-linear payout with a tension brake, and an outside-liner payout with an electrically controllable brake.

According to one feature, the third fiber optic dispenser is selected from an inside-payout dispenser with a tension brake, an outside-linear payout with a tension brake, and an outside-liner payout with an electrically controllable brake.

According to one feature, the fourth fiber optic dispenser is selected from an inside-payout dispenser with a tension brake, an outside-linear payout with a tension brake, and an outside-liner payout with an electrically controllable brake.

According to another aspect, an unmanned aerial vehicle (UAV) system is provided. The UAV system comprises a first expendable fiber-optic link; a first UAV connected to a distal end of the expendable fiber-optic link; and a mobile ground station connected to a proximal end of the first expendable fiber-optic link. The mobile ground station comprises a power source for providing power to the UAV via the expendable fiber-optic link; a processing system configured to perform executable operational and application specific pre-programmed commands and instructions; an electro-optic converter connected to the power source and the processing system; and a tension setting module connected to the electro-optic converter for controlling tension of the expendable fiber-optic link. The UAV system further comprises a first fiber-optic dispenser connected to the proximal end of the first expendable fiber-optic link; a second fiber-optic dispenser connected to the distal end of the expendable fiber-optic link; a second UAV connected to the first UAV by a second expendable fiber-optic cable; a third fiber-optic dispenser connected to a proximal end of the second expendable fiber-optic cable; and a fourth fiber-optic dispenser connected to a distal end of the second expendable fiber-optic cable.

According to one feature, the UAV system further comprises a remote controller communicatively coupled to the mobile ground station for receiving and responding to commands and instructions transmitted remotely.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION OF THE INVENTION

Figure 1:
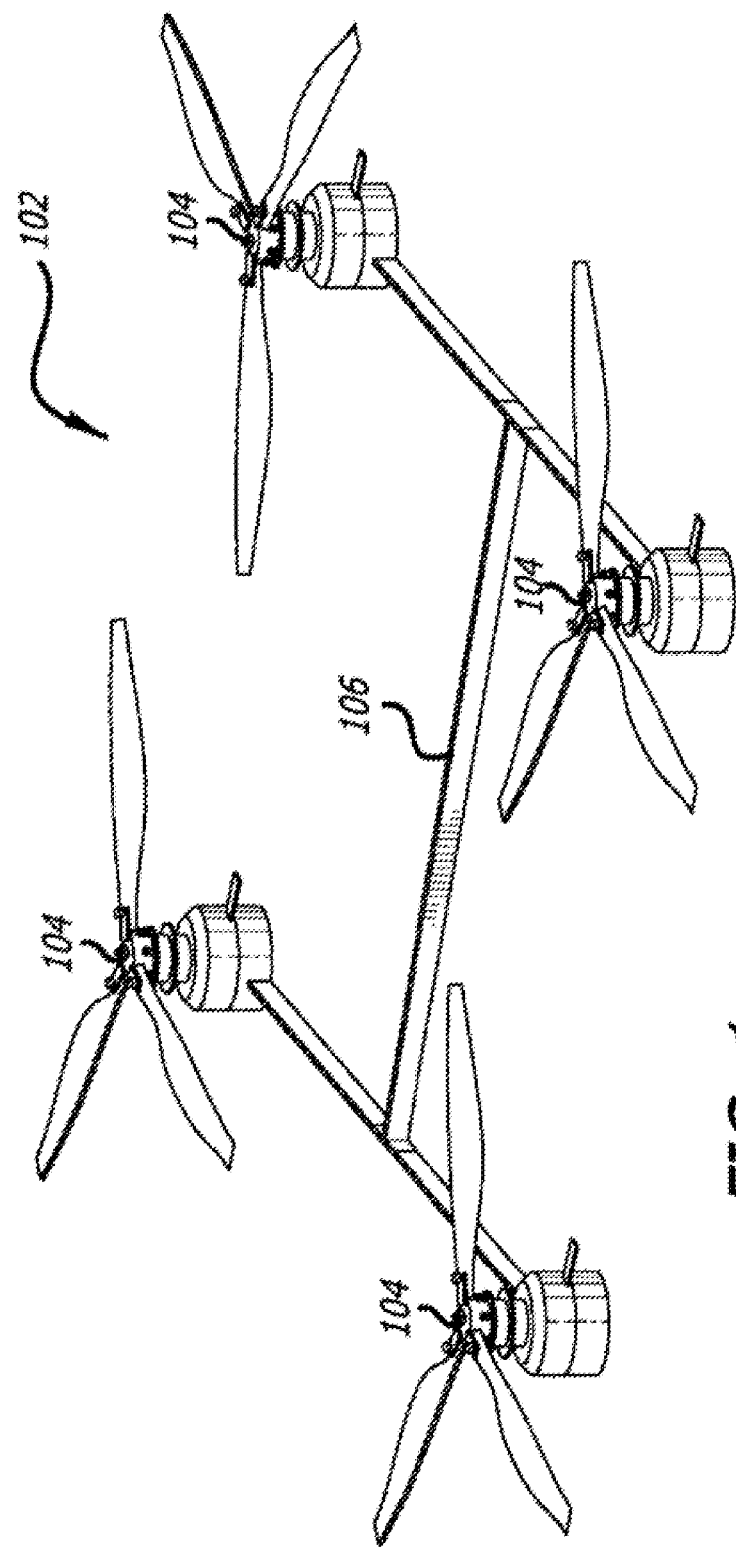
FIG. 1 is an isometric view of a simplified unmanned aerial vehicle according to at least one example of the present disclosure.

In the following detailed description, numerous specific details are set forth in order to provide a thorough understanding of the different aspects. However, it will be understood by one of ordinary skill in the art that the different aspects may be practiced without these specific details. For example, well-known operations, structures, and techniques may not be shown in detail in order not to obscure the different aspects presented herein.

The term "computer-readable medium" as used herein refers to any tangible storage that participates in providing instructions to a processing system for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "central processing unit", "processor", "processor circuit", "processing system", and "processing circuit", and variations thereof, as used herein, are used interchangeably and include, but are not limited to, a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general-purpose processor may include a microprocessor, as well as any conventional processor, controller, microcontroller, or state machine. The processor may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processors are for illustration and other suitable configurations within the scope of the disclosure are also contemplated. Furthermore, the processor may be implemented as one or more processors, one or more controllers, and/or other structure configured to execute executable programming The terms "determine," "calculate," and "compute," and variations thereof, as used herein, are used interchangeably and include any type of methodology, process, mathematical operation or technique.

The term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The term "module" as used herein refers to any known or later developed hardware, software, firmware, artificial intelligence, fuzzy logic, or combination of hardware and software that is capable of performing the functionality associated with that element.

In the following description, certain terminology is used to describe certain features of one or more embodiments. The terms "Unmanned Aerial Vehicle ("UAV")", "Unmanned Aerial System ("UAS")", "Aerial Vehicle", and "drone" may be used interchangeably and have the same meaning. The term "airborne platform" may be used to describe an UAV.

The term "fixed ground station" may refer to any type of object capable of communicating with and powering a UAV as well as providing, receiving, and responding to commands and instructions.

The term "mobile ground station" may refer to any type of moveable object (e.g., which may traverse the air, land, water, or space) for the carrying of cargo or passengers, including but not limited to, trucks, airplanes, cars, vans, motorcycles, bicycles, boats, ships, and trains.

The term "mobile ground station" may refer to any type of unmanned moveable object that is capable of receiving and responding to commands and instructions transmitted remotely, such as from a remote controller. The term "mobile ground station" may also refer to any type of manned moveable object that is capable of receiving and responding to commands and instructions from an operator on-board the mobile ground station controlling the operation and movement of the ground station.

The terms "fiber-optic cable", "expendable fiber-optic link", and "airborne expendable fiber-optic link" may be used interchangeably and have the same meaning.

The illustrations presented herein are, in some instances, not actual views of any particular aerial vehicle, or other specific components of an aerial vehicle, but are merely idealized representations which are employed to describe the present disclosure. Additionally, elements common between figures may retain the same numerical designation.

Overview

According to one aspect, unmanned aerial vehicles tethered to ground stations with an expendable airborne fiber-optic link are provided. The tethers may be fiber-optic cables that can be used as a communications conduit between a ground station and a UAV for providing vehicle positioning/control information to the UAV as well as transmitting a large amount of information/data to the UAV. As the information being transmitted between to the UAV the ground station is critical, fiber-optic cables provide the bandwidth and transmission capabilities required with the added benefit of electromagnetic interference (EMI) and radio-frequency interference (RFI) immunity, making this an ideal solution for these applications.

According to another aspect, the present disclosure provides a fiber-optic cable that is an expendable fiber-optic link that limits the rate of dispensing of the fiber-optic link and thus limits the rate that the expendable fiber-optic link is dispensed, or stopping fiber payout entirely while the UAV is hovering or maneuvering in such a way that the expendable fiber-optic link distance is not substantially changing between the UAV and first point where the expendable fiber-optic link contacts the terrain or other positionally-stable object.

According to yet another aspect, the present disclosure provides for an increase range of many miles that the UAV may travel in a small, light-weight package by use of non-armored, non-jacketed fiber-optic cable, reducing the weight (<1 kg/km for buffered fiber, versus 10-30 kg/km for many drone-specific fiber-optic cable and fiber-optic cable plus power cables). This lightweight fiber-optic cable can be utilized when the tension of the fiber-optic cable is carefully controlled through the duration of operation. Unlike prior art systems, a winch to spool out and in the fiber-optic cable as the ground or UAV moves is not needed.

According to yet another aspect, the present disclosure provides for a dispenser on each moving body (i.e., on the UAV or airborne platform for fixed-ground to air operations; or, dispensers on both the air and ground platforms when each platform may be moving during operations; or, on both airborne platforms if two platforms are both maneuvering and communicating), the bare buffered fiber-optic cable is not dragged across terrain or other objects, and instead is laid in place as the dynamic platform moves.

By having a dispenser on each moving body (i.e., on the airborne platform (UAV) for fixed-ground to air operations; or, dispensers on both the air and ground platforms when each platform may be moving during operations; or, on both airborne platforms if two platforms are both maneuvering and communicating), the bare buffered fiber-optic cable is never dragged across terrain or other objects, and instead is laid in place as the dynamic platform moves.

The present disclosure limits the rate of dispensing, limiting the rate that fiber-optic cable is dispensed, or stopping fiber payout entirely while the airborne platform is hovering or maneuvering in such a way that the fiber distance is not substantially changing between the aircraft and first point where the fiber-optic cable contacts the terrain or another positionally-stable object.

Unmanned Aerial Vehicle

Referring to FIG. 1, an example of a simplified Unmanned Aerial Vehicle ("UAV") 102 is depicted according to at least one example. Generally, the UAV 102 includes a plurality of rotors or propellers 104 coupled to a frame 106. Each propeller 104 may be operably coupled with a motor to spin the propellers 104 in a manner to generate thrust. In some embodiments, a respective motor may be coupled to each respective propeller 104. In other embodiments, a motor may be coupled to more than one propeller 104. Although the frame 106 in FIG. 1 is relatively simple, it should be understood that various embodiments of the present disclosure may employ a plurality of differently shaped and sized frames. In some embodiments, a lift surface (not shown) may be coupled to the frame 106. Such a lift surface may include, by way of example and not limitation, an airfoil configured to provide lift to the UAV 102 when the UAV 102 is moving with a positive forward airspeed.

Fixed Ground Station—Unmanned Aerial Vehicle

Figure 2:
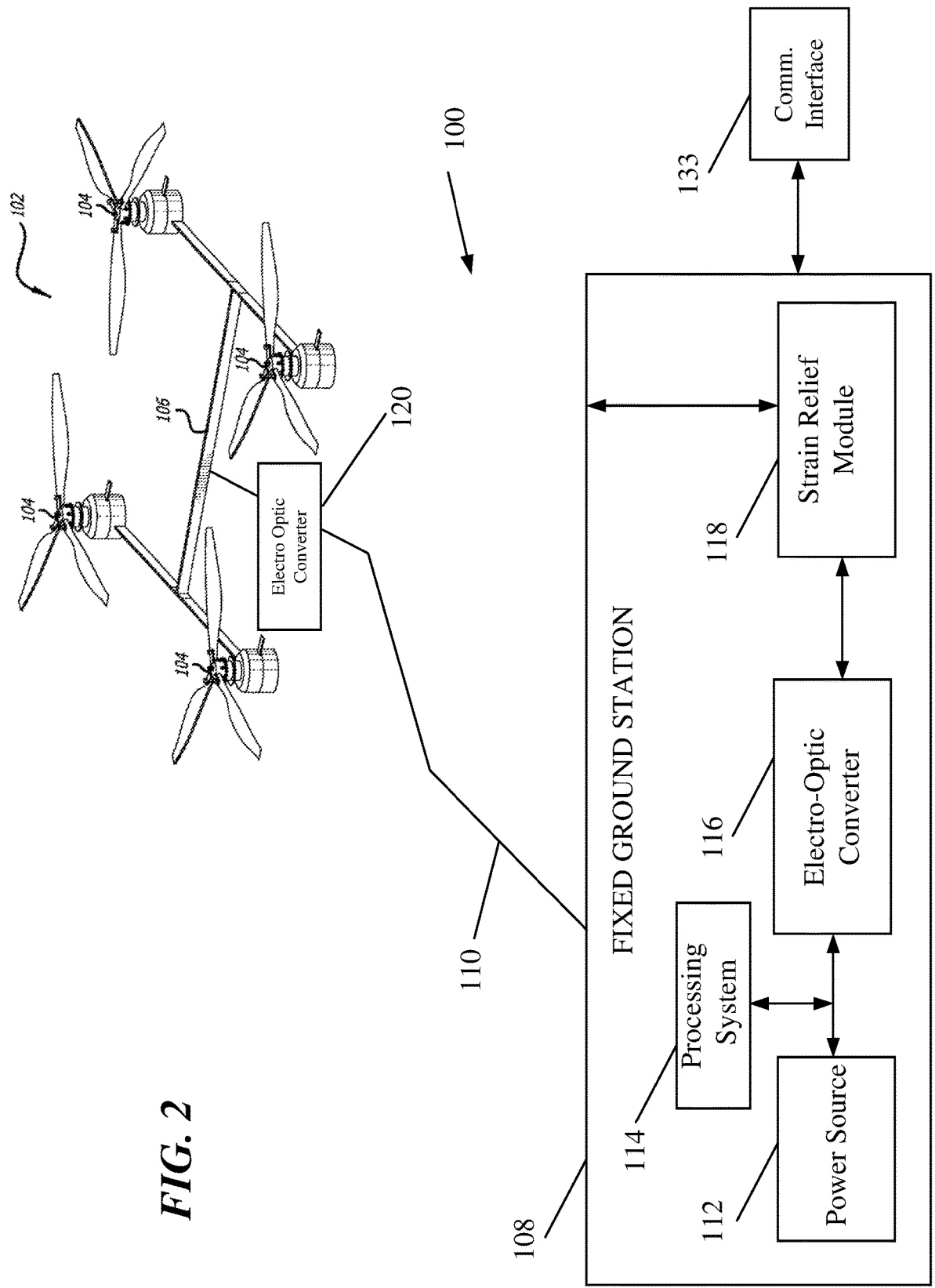
FIG. 2 is an example UAV system comprising a UAV and a fixed ground station, in accordance with some embodiments.

FIG. 2 shows an example UAV system 100 comprising a UAV 102 and a fixed ground station 108 where the UAV 102 is connected to the fixed ground station 108 by an expendable airborne fiber-optic link 110. The expendable airborne fiber-optic link 110 may provide power, communication or both power and communications between the UAV 102 and the fixed ground station 110. The proximal end of the expendable airborne fiber-optic link 110 is connected to the fixed ground station 108 and the distal end of the expendable airborne fiber-optic link 110 is connected to the UAV 102.

In accordance with at least some embodiments, the fixed ground station 108 may include a power source 112, a processing system 114, an electro-optic converter 116, and a strain relief module 118. The power source 112 supplies power to the UAV 102, the processing system 114 may execute operational and application specific pre-programmed commands and instructions, the electro-optic converter 116 converts light, or a change in light, into an electronic signal, and the strain relief module 118 protects the expendable airborne fiber-optic link 110 against damage from an axially applied load and prevents strain at the connection point to the electro-optic converter 116. The strain relief module 118 may be accomplished by any means known in the art, including but not limited to, a mandrel with a few turns of the expendable airborne fiber-optic link 110 spun around the mandrel, a section of the expendable airborne fiber-optic link 110 adhered/fixed/glued to a stationary fixture, and a clamping mechanism that is radially clamped around the expendable airborne fiber-optic link 110. A second electro-optic converter 120 may be located on the distal end of the expendable airborne fiber-optic link 110. A communication interface 133 may be connected to the fixed ground station 108 for facilitating the wired and/or wireless communication of information bi-directionally with various other apparatus over a transmission medium.

In accordance with at least some embodiments, the expendable airborne fiber-optic link 110 may be released and the UAV 102 may transition to a battery-powered free flight.

Mobile Ground Station—Unmanned Aerial Vehicle

Figure 3:
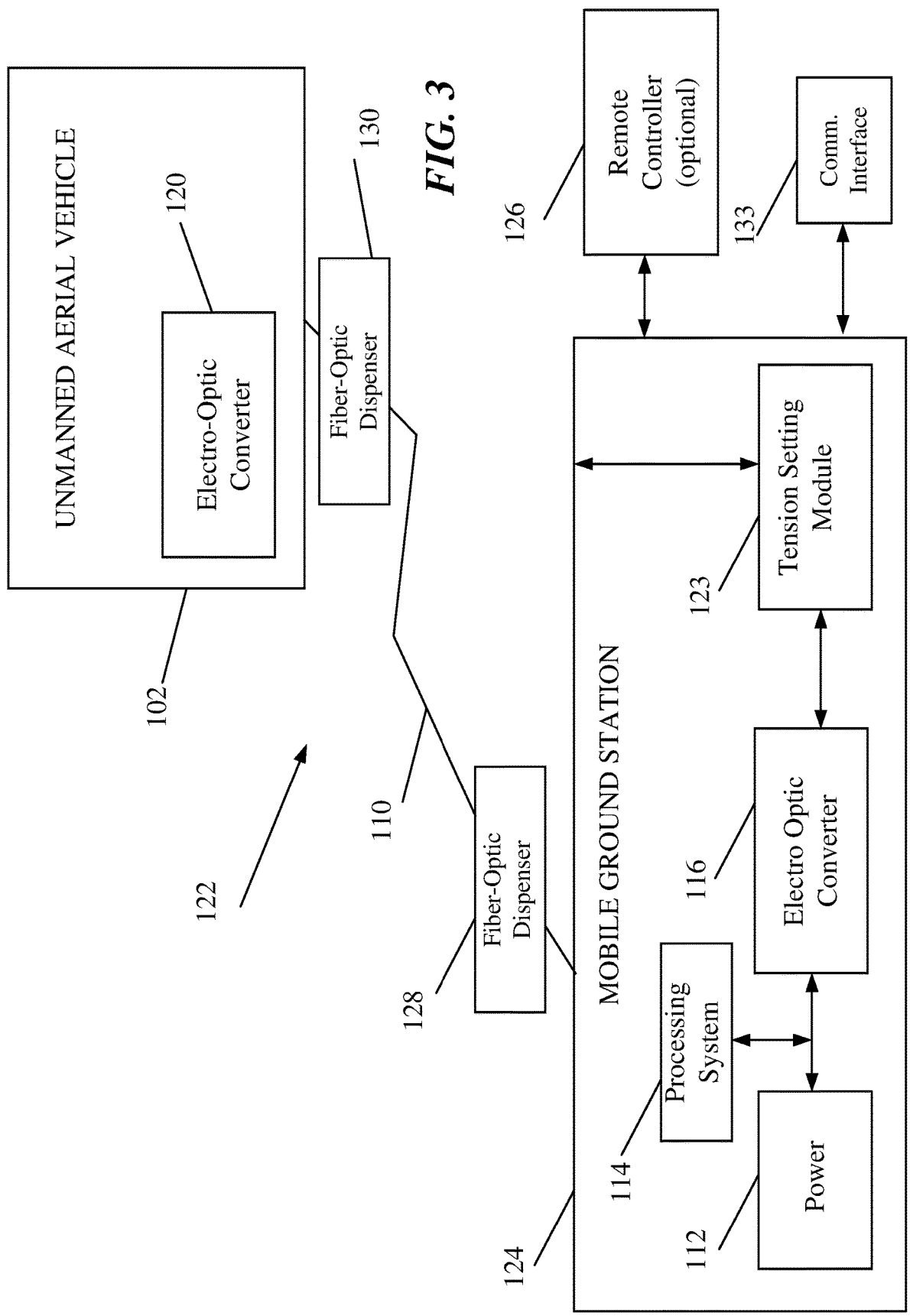
FIG. 3 is an example UAV system comprising a UAV and a mobile ground station, in accordance with some embodiments.

FIG. 3 shows example UAV system 122 comprising a UAV 102 and a mobile ground station 124 where the UAV 102 is connected to the fixed ground station 108 by an expendable airborne fiber-optic link 110. The expendable airborne fiber-optic link 110 may provide power, communication or both power and communications between the UAV 102 and the mobile ground station 124. In some instances, the mobile ground station 124 may be capable of operating autonomously or semi-autonomously and following a set of pre-programmed commands and instructions. The mobile ground station 124 may operate semi-autonomously by responding to one or more commands from a remote controller 126 while otherwise operating autonomously. For example, one or more commands from a remote controller may initiate a sequence of autonomous or semi-autonomous actions by the UAV 102.

In accordance with at least some embodiments, the mobile ground station 124 may include a power source 112, a processing system 114, an electro-optic converter 116, and a tension setting module 123. A first fiber-optic dispenser 128 is secured to the mobile ground station 124 and a fixed, proximal end of the expendable airborne fiber-optic link 110 connected to the electro-optic converter 116. The distal end of the expendable airborne fiber-optic link 110 is connected to either the distal end of another fiber-optic dispenser 130 (for communications between two moving platforms) or the distal end of a fixed fiber-optic cable (for communication between a moving and non-moving platform). At least as much fiber-optic cable length is in the fiber-optic dispenser as the platform is expected to translate during the operation with the expendable airborne fiber-optic link 110 wound in such a way that it can be pulled out of the dispenser without causing kinks, twists, or rolls in the expendable airborne fiber-optic link 110 that is dispensed.

The power source 112 supplies power to the UAV 102, the processing system 114 may execute operational and application specific pre-programmed commands and instructions, and the electro-optic converter 116 converts light, or a change in light, into an electronic signal. The tension setting module 123 is configured to control the tension of the expendable fiber-optic link 110 in order to provide enough tension so that the expendable fiber-optic link 110 cannot be freely pulled out of the fiber-optic dispenser 128 due to the weight of the expendable airborne fiber-optic link 110 suspended in the air, even at the targeted operating altitude (for airborne platform instantiations) or at the anticipated maximum height from the ground, terrain, or other stationary object (for moving ground/surface platform instantiations). The tension setting module 123 is also configured to provide enough damping so that after rapid dispensing of the expendable airborne fiber-optic link 110 during high velocity translation, the expendable airborne fiber-optic link 110 quickly decelerates in dispensing speed to match the pull speed without "freewheeling" or dispensing more of the expendable airborne fiber-optic link 110 than is required by the translation of the mobile ground station 124 and allow the expendable airborne fiber-optic link 110 to freely dispense at and above tensions at a setpoint below the breaking strength/absolute strength of the expendable airborne fiber-optic link 110.

The tension setting module 123 can be instantiated in many different ways, such as a rubber gromet at or near the outlet of the fiber-optic dispenser to provide friction, by using a curved path to amplify tension on the expendable airborne fiber-optic link 110, by the use of adhesives in the windings of the first fiber-optic dispenser 128 to provide a peel strength, or by an active breaking wheel or bearing in the output of the expendable airborne fiber-optic link 110 path for precise computer control of the tension. A communication interface 133 may be connected to the mobile ground station 124 for facilitating the wired and/or wireless communication of information bi-directionally with various other apparatus over a transmission medium.

In at least some embodiments, a second electro-optic converter 130 may be located on the distal end of the expendable airborne fiber-optic link 110.

Unmanned Aerial Vehicle—Unmanned Aerial Vehicle—Fixed Ground Station

Figure 4:
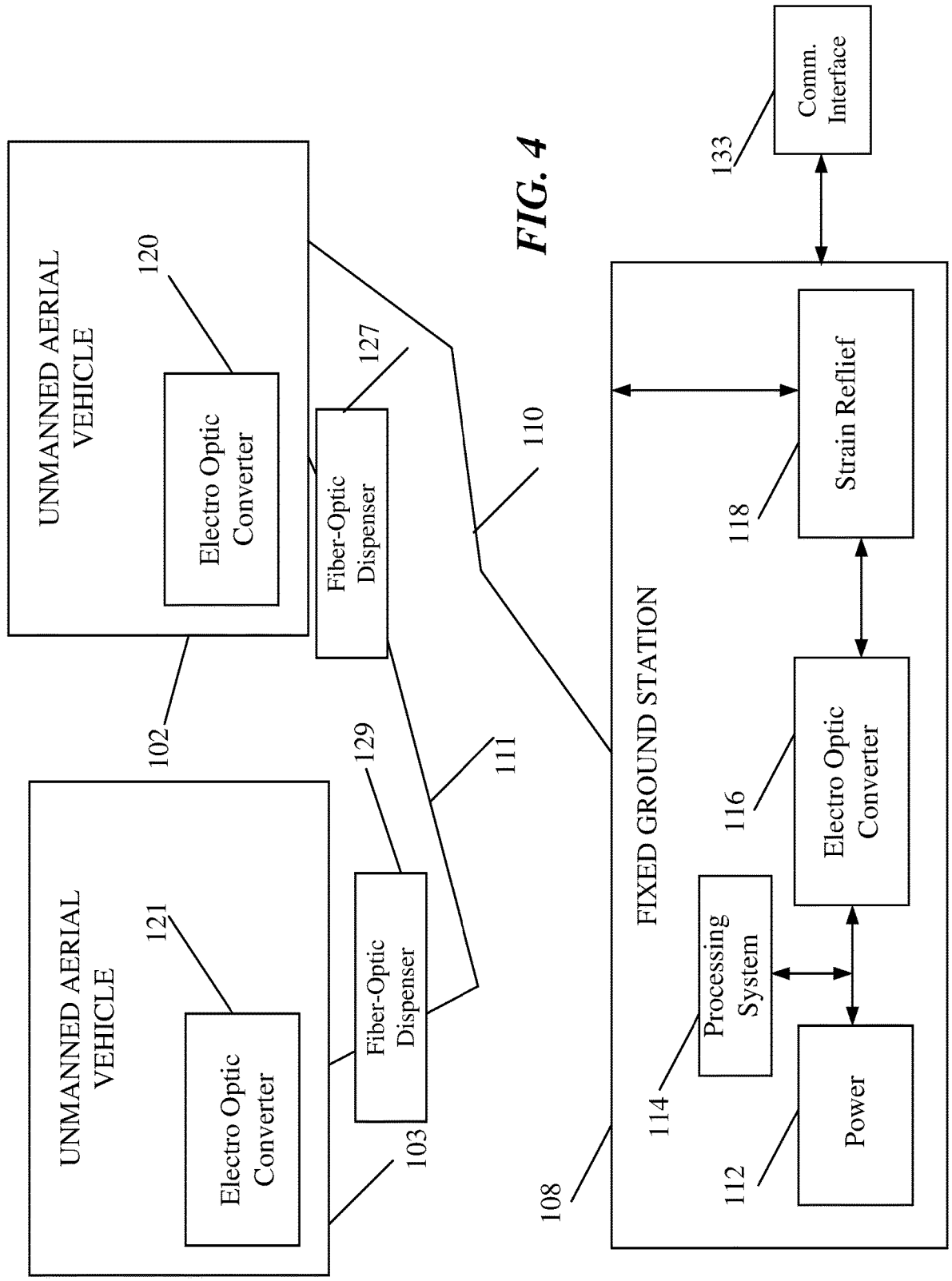
FIG. 4 shows an example UAV system comprising a first UAV connected to a second UAV by an expendable airborne fiber-optic link, the first UAV connected to a fixed ground station by a fixed or expendable airborne fiber-optic link.

FIG. 4 shows an example UAV system comprising a first UAV 102 connected to a second UAV 103 by a second expendable airborne fiber-optic link 111, the first UAV 102 connected to a fixed ground station 108 by a second airborne fiber-optic link 110. The second airborne fiber-optic link 110 may provide power, communication or both power and communications between the first UAV 102 and the fixed ground station 108. The second airborne fiber-optic link 110 may be fixed or expendable. The second airborne fiber-optic link 111 may be fixed or expendable and provides power between the first UAV 102 and the second UAV 103.

In accordance with at least some embodiments, the fixed ground station 108 may include a power source 112, a processing system 114, an electro-optic converter 116, and a strain relief module 118. The power source 112 supplies power to the first UAV 102, the processing system 114 may execute operational and application specific pre-programmed commands and instructions, the electro-optic converter 116 converts light, or a change in light, into an electronic signal, and the strain relief module 118 protects the second airborne fiber-optic link 110 against damage from an axially applied load and prevents strain at the connection point to the electro-optic converter 116. The strain relief module 118 may be accomplished by any means known in the art, including but not limited to, a mandrel with a few turns of the second airborne fiber-optic link 110 spun around the mandrel, a section of the airborne fiber-optic link 110 adhered/fixed/glued to a stationary fixture, and a clamping mechanism that is radially clamped around the second airborne fiber-optic link 110. A second electro-optic converter 120 may be located on the distal end of the second airborne fiber-optic link 110 and a third electro-optic converter 121 may be located on the distal end of the second expendable airborne fiber-optic link 111.

A first fiber-optic dispenser 127 is secured to the first UAV 102 comprising a fixed, proximal end of the second expendable airborne fiber-optic link 111 connected to the electro-optic converter 120. The distal end of the second expendable airborne fiber-optic link 111 is connected to either the distal end of another fiber-optic dispenser 129 (for communications between two moving platforms) or the distal end of a fixed fiber-optic cable (for communication between a moving and non-moving platform). At least as much fiber-optic cable length is in the first fiber-optic dispenser 127 as is expected to translate during the operation with the first expendable airborne fiber-optic link 111 wound in such a way that it can be pulled out of the dispenser without causing kinks, twists, or rolls in the second expendable airborne fiber-optic link 111 that is dispensed. A communication interface 133 may be connected to the fixed ground station 108 for facilitating the wired and/or wireless communication of information bi-directionally with various other apparatus over a transmission medium.

In accordance with at least some embodiments, the second expendable airborne fiber-optic link 111 may be released from the second UAV 103 and the second UAV 103 may transition to a battery-powered free flight.

Unmanned Aerial Vehicle—Unmanned Aerial Vehicle—Mobile Ground Station

Figure 5:
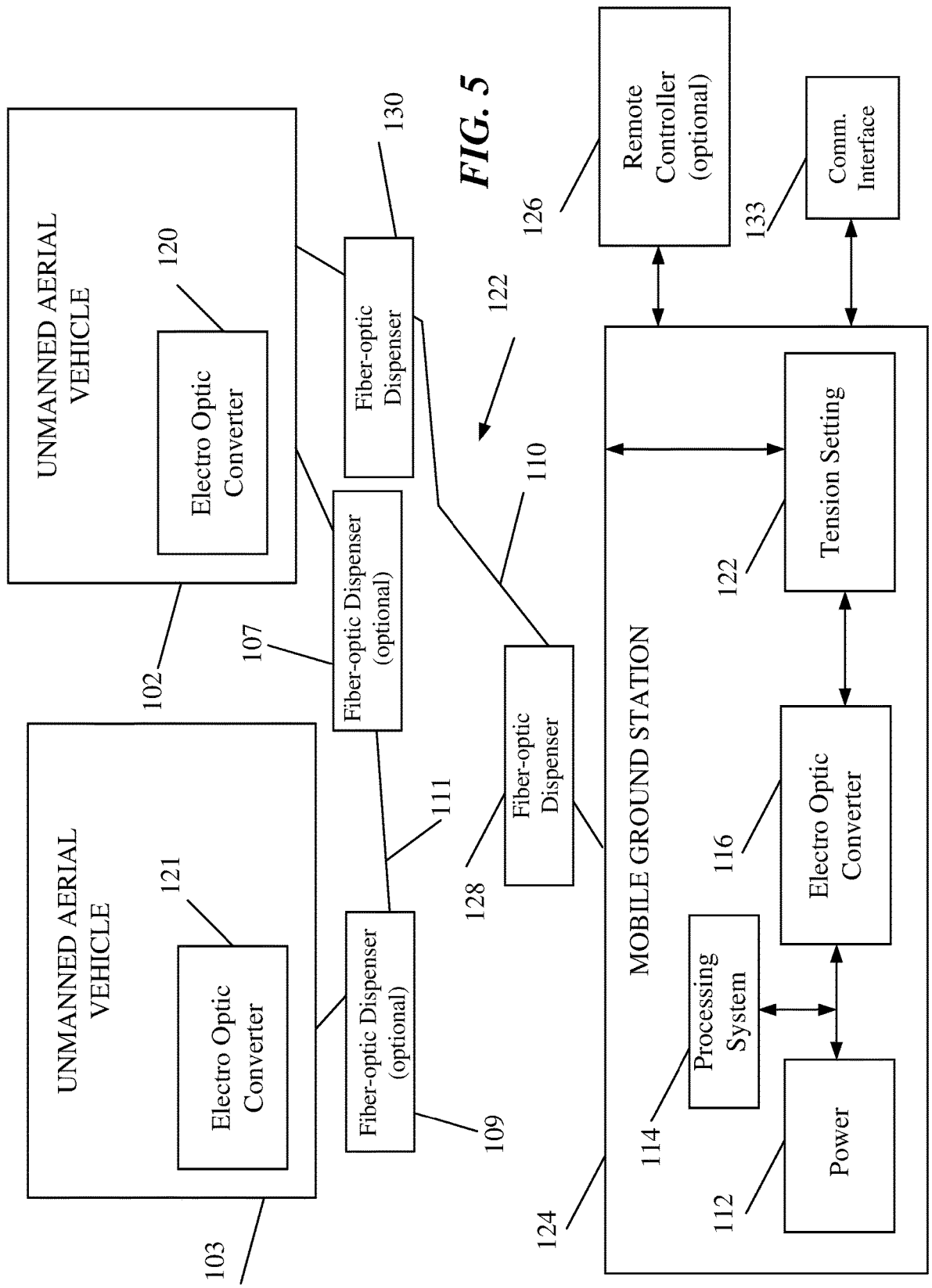
FIG. 5 shows an example UAV system comprising a first UAV connected to a second UAV by a first expendable airborne fiber-optic link, the first UAV connected to a mobile ground station.

FIG. 5 shows an example UAV system comprising a first UAV 102 connected to a second UAV 103 by a second expendable fiber-optic link 111, the first UAV 102 connected to a mobile ground station 124. The first expendable fiber-optic link 110 may provide power, communication or both power and communications between the first UAV 102 and the mobile ground station 124. The second expendable airborne fiber-optic link 111 may be fixed or expendable and provides power between the first UAV 102 and the second UAV 103.

In accordance with at least some embodiments, the mobile ground station 124 may include a power source 112, a processing system 114, an electro-optic converter 116, and a tension setting module 123. A first fiber-optic dispenser 128 is secured to the mobile ground station 124 comprising a fixed, proximal end of the first airborne fiber-optic link 110 connected to the electro-optic converter 116. The distal end of the first expendable airborne fiber-optic link 110 is connected to either the distal end of another fiber-optic dispenser 130 (for communications between two moving platforms) or the distal end of a fixed fiber-optic cable (for communication between a moving and non-moving platform). At least as much fiber-optic cable length is in the fiber-optic dispenser 128 as the platform is expected to translate during the operation with the first airborne fiber-optic link 110 wound in such a way that it can be pulled out of the dispenser without causing kinks, twists, or rolls in the first airborne fiber-optic link 110 that is dispensed.

A second electro-optic converter 120 may be located on the distal end of the first airborne fiber-optic link 110 and a third electro-optic converter 121 may be located on the distal end of the second expendable airborne fiber-optic link 111. A communication interface 133 may be connected to the mobile ground station 124 for facilitating the wired and/or wireless communication of information bi-directionally with various other apparatus over a transmission medium.

Optionally, in accordance with at least some embodiments, third fiber-optic dispenser 107 may be connected to a proximal end of the second expendable fiber-optic link 111 and a fourth fiber-optic dispenser 109 may be connected to a distal end of the expendable fiber-optic link 111.

In some instances, the mobile ground station 124 may be capable of operating autonomously or semi-autonomously and following a set of pre-programmed commands and instructions. The mobile ground station 124 may operate semi-autonomously by responding to one or more commands from a remote controller 126 while otherwise operating autonomously. For example, one or more commands from a remote controller may initiate a sequence of autonomous or semi-autonomous actions by the UAV 102.

Processing System

Figure 6:
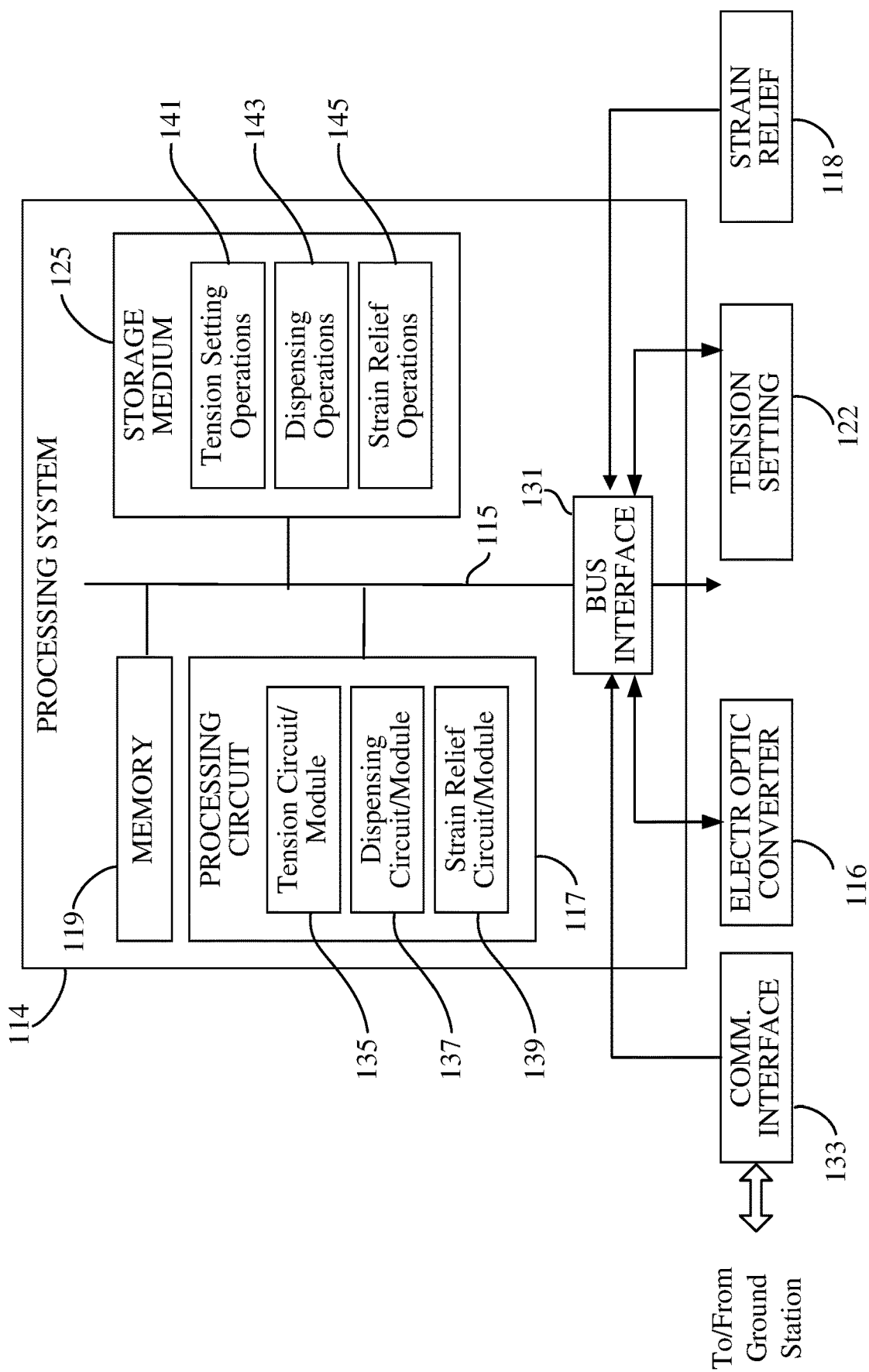
FIG. 6 is a block diagram illustrating select components that may be included in processing system, in accordance with some embodiments.

As represented in FIGS. 2-5, both fixed and mobile ground stations 108, 124 include a processing system 114. FIG. 6 is a block diagram schematically illustrating select components that may be included in a processing system 114, although it should be apparent that a processing system of the present disclosure may include additional, different, and/or fewer components than those depicted.

In this example, the processing system 114 is implemented with a bus architecture, represented generally by the bus 115. The bus 115 may include any number of interconnecting buses and bridges depending on the specific application of the processing system 114 and the overall design constraints. The bus 115 communicatively couples together various circuits including one or more processors (represented generally by the processing circuit 117), a memory 119, and computer-readable media (represented generally by the storage medium 125). The bus 115 may also link various other circuits such as timing sources, peripherals, voltage regulators, and power management circuits, which are well known in the art, and therefore, will not be described any further. A bus interface 131 provides an interface between the bus 115 and one or more components, including a communications interface 133, an electro optic converter 116, tension setting module 122, and/or strain relief 118. The communications interface 133 is configured to facilitate wireless and/or wired communications of the fixed and mobile ground stations. For example, the communications interface 133 may include circuitry and/or programming adapted to facilitate the wired and/or wireless communication of information bi-directionally with various other apparatus over a transmission medium. In at least one embodiment, a user interface (e.g., keypad, display, touchscreen, etc.) may also be provided.

The processing circuit 117 is responsible for managing the bus 115 and general processing, including the execution of programming stored on the computer-readable storage medium 125. The programming, when executed by the processing circuit 117, causes the processing system 114 to perform the various functions described below for any particular apparatus. The computer-readable storage medium 125 and the memory 119 may also be used for storing data that is manipulated by the processing circuit 117 when executing programming As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 117 is arranged to obtain, process and/or send data, control data access and storage, issue commands, and control other desired operations. The processing circuit 117 may include circuitry adapted to implement desired programming provided by appropriate media, and/or circuitry adapted to perform one or more functions described in this disclosure. For example, the processing circuit 117 may be implemented as one or more processors, one or more controllers, and/or other structure configured to execute executable programming and/or execute specific functions. Examples of the processing circuit 117 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 406 117 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 117 are for illustration and other suitable configurations within the scope of the present disclosure are also contemplated.

In some instances, the processing circuit 117 may include a tension circuit and/or module 135, a dispensing circuit and/or module 137, and a strain relief circuit and/or module 139. The tension circuit/module 135 may generally include circuitry and/or programming (e.g., programming stored on the storage medium 125) adapted to control and/or make decisions based on information from one or more components (e.g., electro optic converter 116, the tension setting 122, and the strain relief 118) to determine and control the expendable airborne fiber-optic link. The dispensing circuit/module 137 may generally include circuitry and/or programming (e.g., programming stored on the storage medium 125) adapted to control and/or make decisions based on information from one or more from one or more components (e.g., electro optic converter 116, the tension setting 122, and the strain relief 118 to dispense the expendable airborne fiber-optic link. The strain relief circuit/module 139 may generally include circuitry and/or programming (e.g., programming stored on the storage medium 125) adapted to control and/or make decisions based on information from one or more components (e.g., electro optic converter 116, the tension setting 122, and the strain relief 118) to adjust strain on the expendable airborne fiber-optic link. As used herein, reference to circuitry and/or programming may be generally referred to as logic (e.g., logic gates and/or data structure logic).

The storage medium 125 may represent one or more computer-readable devices for storing programming, such as processor executable code or instructions (e.g., software, firmware), electronic data, databases, or other digital information. The storage medium 125 may also be used for storing data that is manipulated by the processing circuit 117 when executing programming The storage medium 125 may be any available non-transitory media that can be accessed by a general purpose or special purpose processor, including portable or fixed storage devices, optical storage devices, and various other mediums capable of storing, containing and/or carrying programming By way of example and not limitation, the storage medium 125 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 125 may be coupled to the processing circuit 117 such that the processing circuit 117 can read information from, and write information to, the storage medium 125. That is, the storage medium 125 can be coupled to the processing circuit 117 so that the storage medium 125 is at least accessible by the processing circuit 117, including examples where the storage medium 125 is integral to the processing circuit 117 and/or examples where the storage medium 125 is separate from the processing circuit 117 (e.g., resident in the processing system 114, external to the processing system 114, distributed across multiple entities).

Programming stored by the storage medium 125, when executed by the processing circuit 117, can cause the processing circuit 117 to perform one or more of the various functions and/or process steps described herein. In at least some examples, the storage medium 125 may include tension operations 141, dispensing operations 143, and/or strain relief operations 145. The tension operations 141 are generally adapted to cause the processing circuit 117 to control, determine, and/or make decisions based on information from one or more of the electro optic converter 116, the tension setting 122, and the strain relief 118 to adjust strain on the expendable airborne fiber-optic link as described herein. The dispensing operations 143 are generally adapted to cause the processing circuit 117 to control, determine, and/or make decisions based on information gathered from one or more of the electro optic converter 116, the tension setting 122, and the strain relief 118 to dispense the expendable airborne fiber-optic link as described herein. The strain relief operations 145 are generally adapted to cause the processing circuit 117 to control, determine, and/or make decisions based on information from the electro optic converter 116, the tension setting 122, and the strain relief 118 to adjust strain on the expendable airborne fiber-optic link as described herein.

Thus, according to one or more aspects of the present disclosure, the processing circuit 117 is adapted to perform (independently or in conjunction with the storage medium 125) any or all of the processes, functions, steps and/or routines for any or all of the ground stations described herein (e.g., fixed ground station 108, mobile ground station 124). As used herein, the term "adapted" in relation to the processing circuit 117 may refer to the processing circuit 117 being one or more of configured, employed, implemented, and/or programmed (in conjunction with the storage medium 125) to perform a particular process, function, step and/or routine according to various features described herein.

Fiber-Optic Dispensers for Tethered Drones

Tension control is desired for fiber-optic tethered drones. As the drone flies higher, the weight of the suspended optical fiber may pull more fiber out of the dispenser than desired if some form of tension control is not used. This limits the range of the drone and may result in loops and tangles that could break the fiber-optic tether.

At least three types of dispensers with tension brakes may be utilized: (1) Inside-Payout with Tension Brake and (2) Outside-Linear Payout with Tension Brake and (3) Outside-Linear Payout with Electronically Controllable Brake.

Inside-Payout Dispenser with Tension Brake

Figure 7:
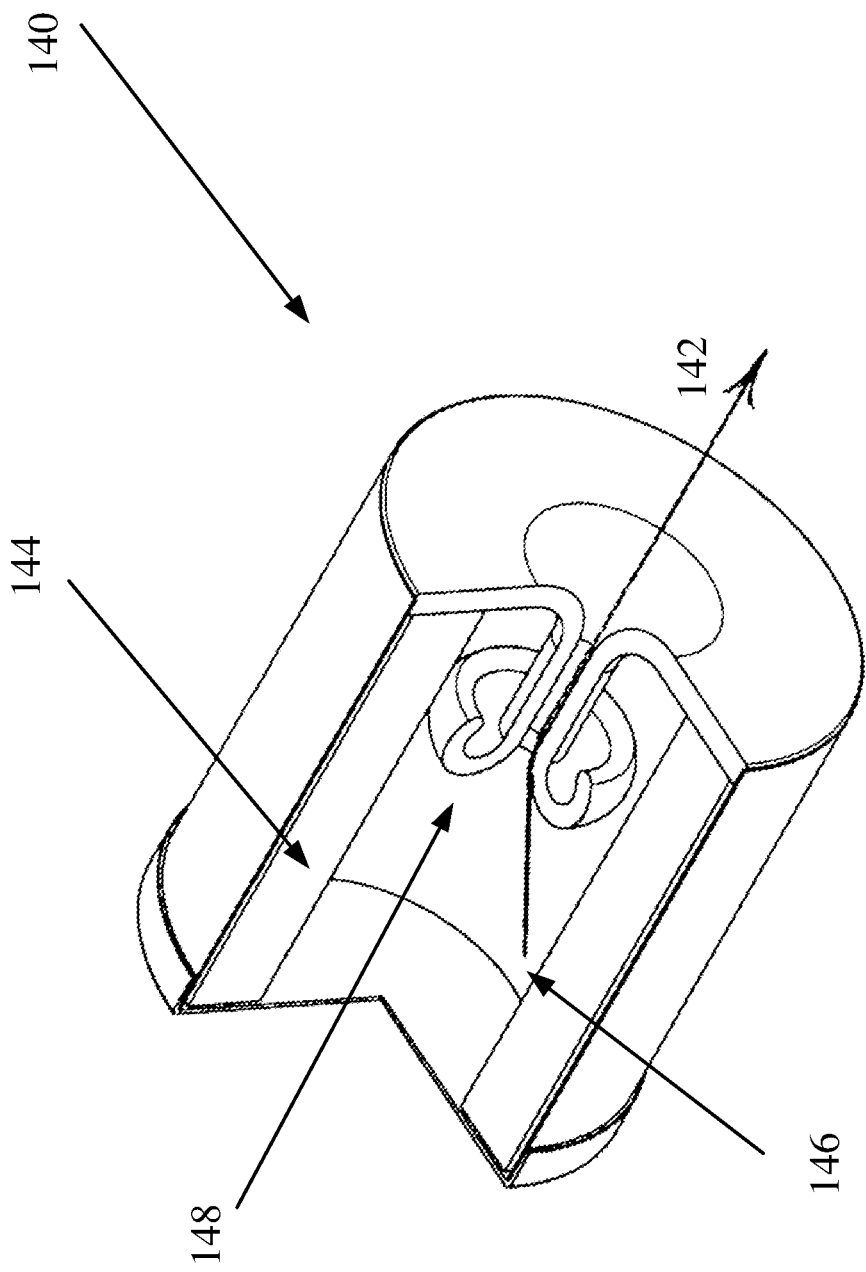
FIG. 7 shows an inside-payout dispenser, in accordance with some embodiments.

FIG. 7 shows an inside-payout dispenser 140, in accordance with some embodiments. Inside-payout dispensers remove optical fiber 142 from the inside of a fiber pack 144. This type of dispenser 140 is held together with a binder material. The binder material is strong enough to provide pack mechanical stability, but weak enough that the fiber 142 separates from the fiber pack 144 at a single "peal point" 146. Tension can be added to an Inside-Payout Dispenser by adding an eyelet 148 at the center of the fiber pack 144.

Tension may be added to the fiber 142 by pulling the fiber 142 over a curved surface. The amount of tension is approximated by the equation:

$$T_{out} = T_{in} \times e^{\beta F}$$

Where, $T_{out}$ is the output tension, $T_{in}$ is the input tension, $\beta$ is the total contact angle, and F is the coefficient of friction.

The total contract angle provided by the eyelet 148 is small; however, the coefficient of friction for inside-payout dispenser packs is relatively high due to the tackiness of the binder material. Placing the eyelet 148 near the center of the fiber pack 144 also provides the advantage of always pulling the fiber 142 away from the flanges helping to avoid dispensing multiple turns or loops that may result in broken fibers.

Since the total contact angle changes as the peel point 146 moves from end-to-end this type of friction brake does not produce a constant tension; however, it is likely to be adequate for most applications to avoid an excessive amount of optical fiber from being dispensed. A major advantage of this approach is its simplicity and low cost.

Outside-Linear Payout Dispenser

Figure 8:
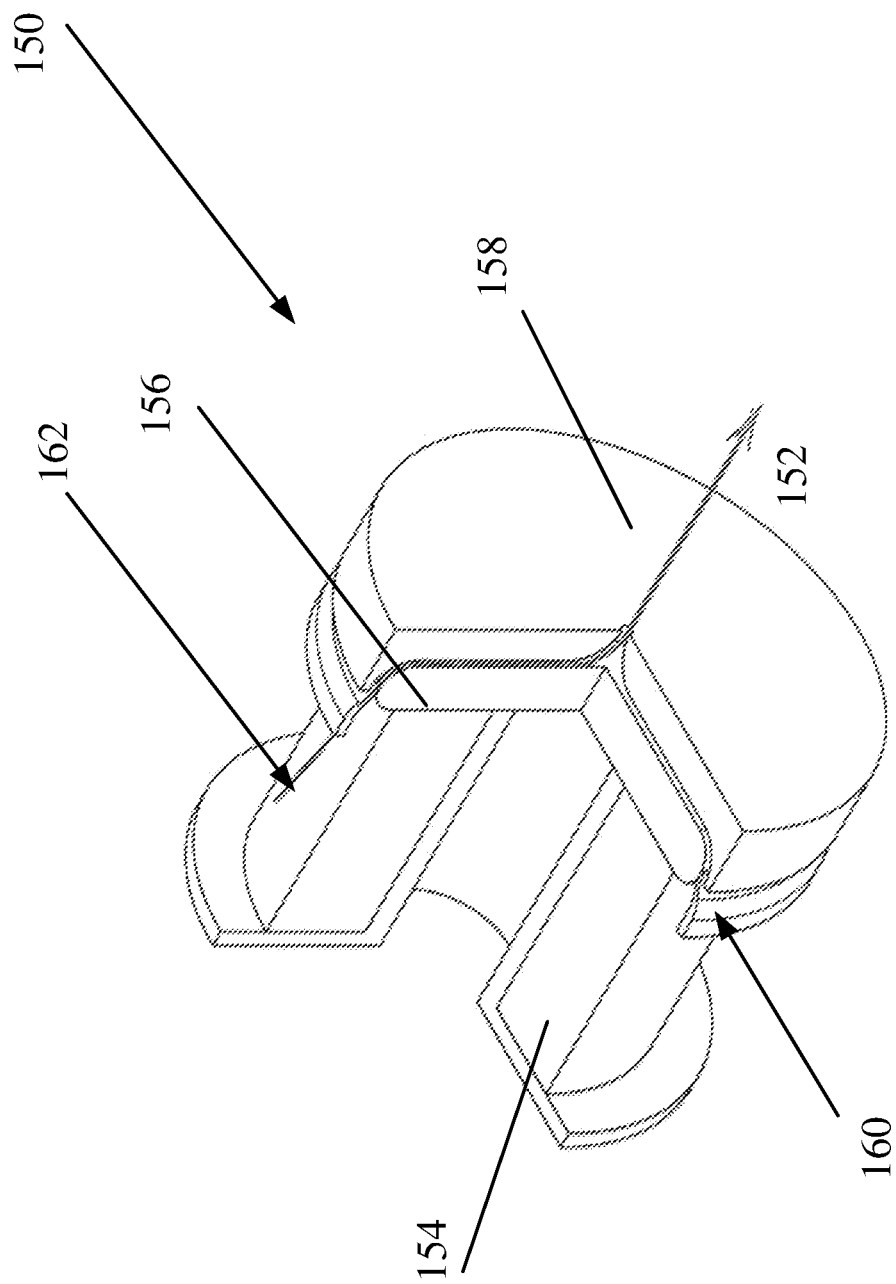
FIG. 8 shows an outside-payout dispenser, in accordance with some embodiments.

FIG. 8 shows an outside-payout dispenser 150, in accordance with some embodiments. Outside-payout dispensers remove optical fiber 152 from the inside of a fiber pack 154 using a spool with a rounded end-guide 156 and cover-guide 158 on the payout end of the dispenser 150. A compliant damper ring 160 is used to maintain a small amount of tension in the fiber 152 between the peel-point 162 and the rounded end-guide 156. Pulling the 152 over the curved surfaces of the rounded end-guide 156 and cover-guide 158 provides additional tension. This type of dispenser does not require a binder material for pack stability. By eliminating the binder this type of dispenser is generally more reliable than inside-payout dispensers. However, outside-payout dispensers are generally physically larger and more expensive.

Outside-Linear Payout with Electronically Controllable Brake

Figure 9:
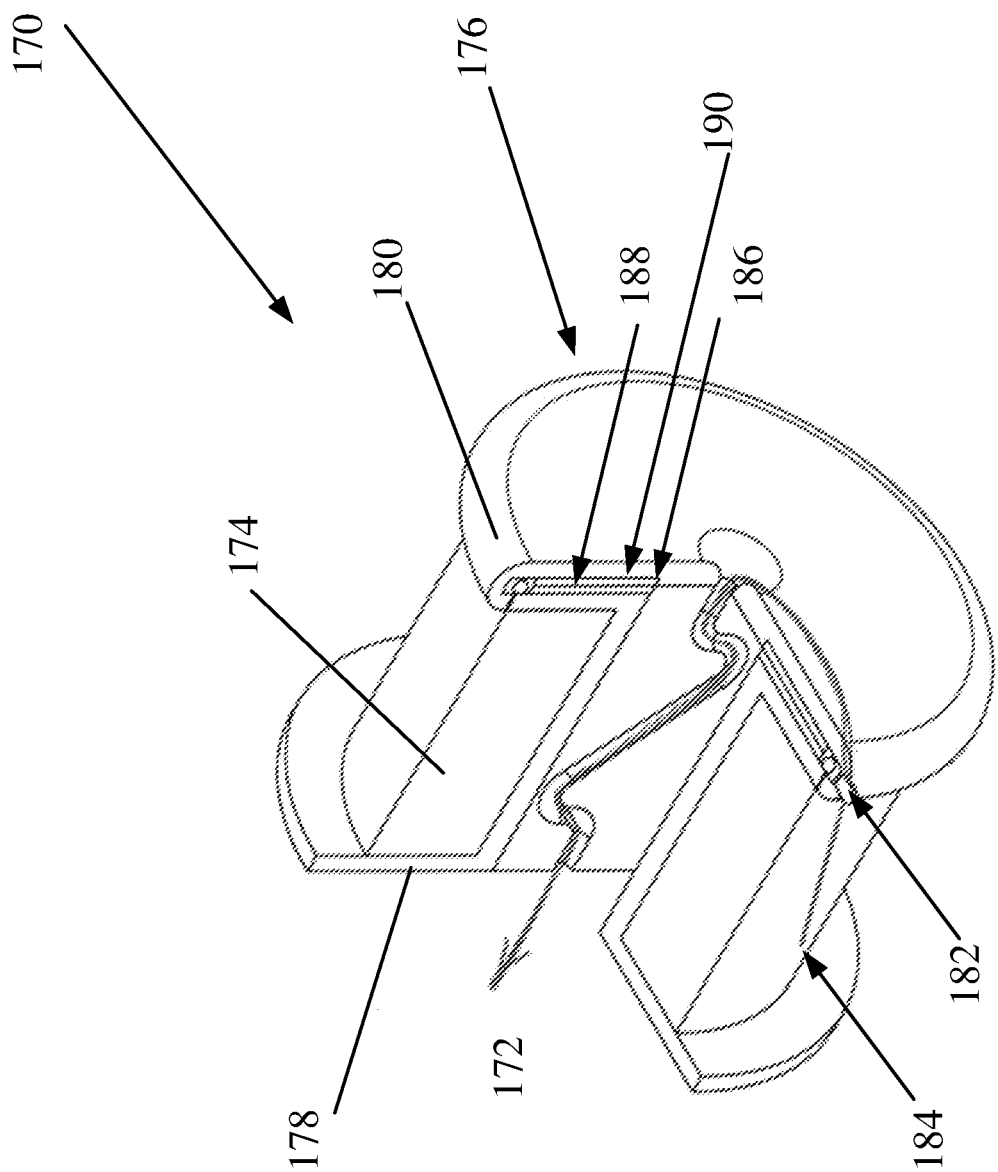
FIG. 9 shown an outside-linear payout dispenser with electronically controllable brake, in according with some embodiments.

FIG. 9 shown an outside-linear payout dispenser 170 with electronically controllable brake, in according with some embodiments. This dispenser 170 removes optical fiber 172 from the inside of a fiber pack 174 using a rounded end-guide 176 connected to the flange 178 with a ring bearing 180. A small ball pin 182 on the end-guide is used to force the end-guide 176 to rotate at the same rate that the peel-point 184 rotates around the surface of the fiber pack 174. Friction across the end-guide 176 is relatively low since the fiber pack 174 does not have a binder material.

Resistance to rotation is provided by a very thin axial flux torque motor 186 located between the stationary flange 178 and the moving end-guide 176. This motor 186 is comprised of a stator 188 attached to the stationary flange 178. The stator 188 has electrically conductive coils in a multilayer printed circuit board. The rotor 190 is attached to the end-guide 176. The rotor 190 has a series of thin permanent magnets, a ferromagnetic plate, or a layer of ferromagnetic nanoparticles embedded in an epoxy layer. Either method can be used to provide an electrically controllable resistive torque, resulting in a small amount of added tension.

The use of a ferromagnetic rotor is that the resistive torque is constant while the use of permanent magnets will result in a series of resistive torque pulses.

This tension can be amplified to the desired level by routing the optical fiber through a serpentine path, adding contact-angle friction.

Figure 10:
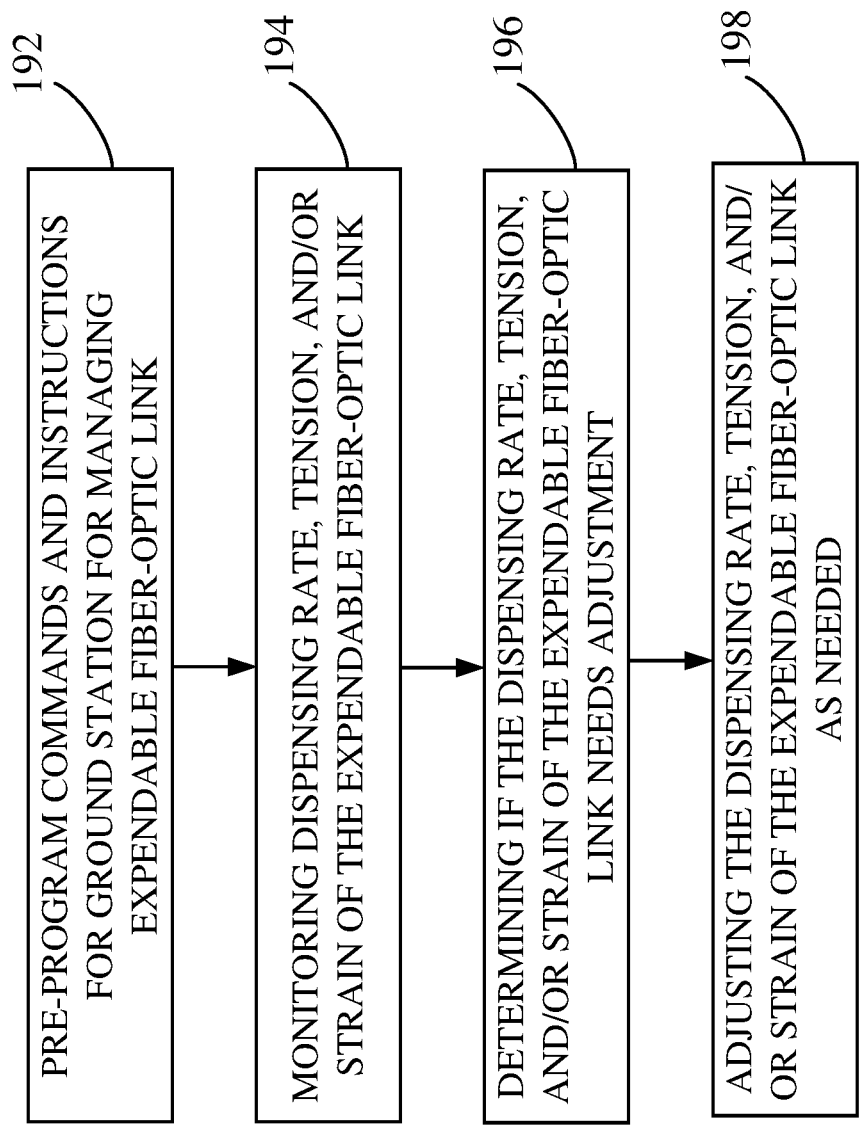
FIG. 10 is a flow diagram illustrating at least one example of a method operational for controlling/adjusting an expendable fiber-optic link connecting a ground station to at least one unmanned aerial vehicle (UAV) in an unmanned aerial vehicle (UAV) system.

In operation, an expendable fiber-optic link 110 may be used as a communications conduit between a ground station and a UAV for providing vehicle positioning/control information to the UAV as well as transmitting a large amount of information/data to the UAV. FIG. 10 is a flow diagram illustrating at least one example of a method operational for controlling/adjusting an expendable fiber-optic link connecting a ground station to at least one unmanned aerial vehicle (UAV) in an unmanned aerial vehicle (UAV) system. With reference to FIGS. 2-5, pre-programmed commands and instruction may be provided to, and stored on, the ground station for managing the expendable fiber-optic link 192. Monitoring the dispensing rate, tension, and/or strain of the expendable fiber-optic link 194. Determining if an adjustment to the dispensing rate, tension, and/or strain of the expendable fiber-optic link needs adjustment 196. Adjusting the dispensing rate, tension, and/or strain of the expendable fiber-optic link as needed 198.

As discussed above, a fiber-optic dispenser is utilized to monitor and control the rate of dispensing of the expendable fiber-optic link while the airborne platform is hovering or maneuvering in such a way that the fiber distance is not substantially changing between the aircraft and first point where the fiber-optic cable contacts the terrain or another positionally-stable object. The tension setting module 123 is configured to control the tension of the expendable fiber-optic link 110 in order to provide enough tension so that the expendable fiber-optic link 110 cannot be freely pulled out of the fiber-optic dispenser 128 due to the weight of the expendable airborne fiber-optic link 110 suspended in the air, even at the targeted operating altitude (for airborne platform instantiations) or at the anticipated maximum height from the ground, terrain, or other stationary object (for moving ground/surface platform instantiations). The tension setting module 123 is also configured to provide enough damping so that after rapid dispensing of the expendable airborne fiber-optic link 110 during high velocity translation, the expendable airborne fiber-optic link 110 quickly decelerates in dispensing speed to match the pull speed without "freewheeling" or dispensing more of the expendable airborne fiber-optic link 110 than is required by the translation of the mobile ground station 124 and allow the expendable airborne fiber-optic link 110 to freely dispense at and above tensions at a setpoint below the breaking strength/absolute strength of the expendable airborne fiber-optic link 110. The strain relief module 118 protects the expendable fiber-optic link 110 against damage from an axially applied load and prevents strain at the connection point to the electro-optic converter 116.

One or more of the components, steps, features and/or functions illustrated herein may be rearranged and/or combined into a single component, step, feature, or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of:" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

The invention claimed is:

1. An unmanned aerial vehicle (UAV) system, the UAV system comprising:
   an expendable airborne fiber-optic link;
   a first UAV connected to a distal end of the expendable fiber-optic link;
   a first fiber-optic dispenser connected to the first UAV;
   a second UAV connected to the first UAV by a second fiber-optic link; and
   a fixed ground station connected to a proximal end of the expendable fiber-optic link, the fixed ground station comprising:
      a processing system configured to perform executable operational and application specific pre-programmed commands and instructions;
      a first electro-optic converter connected to the processing system; and
      a strain relief module, connected between the first fiber-optic dispenser and a length of the dispensed fiber, for preventing damage from an axially applied load and strain at a connection point to the first electro-optic converter.

2. The unmanned aerial vehicle (UAV) system of claim 1, wherein the strain relief module is a mandrel used to wrap the expendable airborne fiber-optic link around.

3. The unmanned aerial vehicle (UAV) system of claim 1, wherein the strain relief module is a section of the expendable airborne fiber-optic link adhered to a stationary fixture on the fixed ground station.

4. The unmanned aerial vehicle (UAV) system of claim 1, wherein the strain relief module is a clamping mechanism radially encircling the expendable airborne fiber-optic link.

5. The unmanned aerial vehicle (UAV) system of claim 1, further comprising a second electro-optic converter located on the distal end of the expendable airborne fiber-optic link.

6. The unmanned aerial vehicle (UAV) system of claim 1, wherein the proximal end of the expendable airborne fiber-optic link is detachable from the UAV for transitioning to a battery powered free flight.

7. The unmanned aerial vehicle (UAV) system of claim 1, further comprising:

a second fiber-optic dispenser connected to a distal end of the second fiber-optic link.

8. An unmanned aerial vehicle (UAV) system, the UAV system comprising:
   a first expendable fiber-optic link;
   a first fiber-optic dispenser connected to a proximal end of the first expendable fiber-optic link;
   a first UAV connected to a distal end of the first expendable fiber-optic link;
   a second UAV connected to the first UAV by a second expendable fiber-optic cable; and
   a mobile ground station connected to a proximal end of the first expendable fiber-optic link, the mobile ground station comprising:
      a processing system configured to perform executable operational and application specific pre-programmed commands and instructions;
      an electro-optic converter connected to the processing system; and
      a tension setting module, connected between the first fiber-optic dispenser and a length of the dispensed fiber-optic link, for controlling tension of the expendable fiber-optic link.

9. The unmanned aerial vehicle (UAV) system of claim 8, further comprising a second fiber-optic dispenser connected to the distal end of the expendable fiber-optic link.

10. The unmanned aerial vehicle (UAV) system of claim 9, wherein the second fiber optic dispenser is selected from an inside-payout dispenser with a tension brake, an outside-linear payout with a tension brake, and an outside-linear payout with an electrically controllable brake.

11. The unmanned aerial vehicle (UAV) system of claim 8, further comprising:
   a third fiber-optic dispenser connected to a proximal end of the second expendable fiber-optic cable; and
   a fourth fiber-optic dispenser connected to a distal end of the second expendable fiber-optic cable.

12. The unmanned aerial vehicle (UAV) system of claim 11, wherein the third fiber optic dispenser is selected from an inside-payout dispenser with a tension brake, an outside-linear payout with a tension brake, and an outside-linear payout with an electrically controllable brake.

13. The unmanned aerial vehicle (UAV) system of claim 11, wherein the fourth fiber optic dispenser is selected from an inside-payout dispenser with a tension brake, an outside-linear payout with a tension brake, and an outside-linear payout with an electrically controllable brake.

14. The unmanned aerial vehicle (UAV) system of claim 8, wherein the first fiber optic dispenser is selected from an inside-payout dispenser with a tension brake, an outside-linear payout with a tension brake, and an outside-linear payout with an electrically controllable brake.

15. The unmanned aerial vehicle (UAV) system of claim 14, wherein the outside-linear payout with the electrically controllable brake comprises:
   a fiber pack for storing and dispensing the fiber-optic link;
   a rounded end-guide, for guiding the fiber-optic link, having a ball pin for restricting payout of fiber-optic link;
   an axial flux motor, integrated into the rounded end-guide, having a layer of ferromagnetic nanoparticles embedded in an epoxy layer; and
   a DC voltage applied to a stator of the axial flux motor for providing a constant resistive torque.

16. The unmanned aerial vehicle (UAV) system of claim 15, wherein amplification of fiber tension applied to the fiber-optic link by the axial flux motor achieves desired tension at output of the fiber pack.

17. An unmanned aerial vehicle (UAV) system, the UAV system comprising:
   a first expendable fiber-optic link;
   a first UAV connected to a distal end of the expendable fiber-optic link; and
   a mobile ground station connected to a proximal end of the first expendable fiber-optic link, the mobile ground station comprising:
      a processing system configured to perform executable operational and application specific pre-programmed commands and instructions;
      an electro-optic converter connected to the processing system; and
      a tension setting module connected to the electro-optic converter for controlling tension of the expendable fiber-optic link; and
   a first fiber-optic dispenser connected to the proximal end of the first expendable fiber-optic link;
   a second fiber-optic dispenser connected to the distal end of the expendable fiber-optic link;
   a second UAV connected to the first UAV by a second expendable fiber-optic cable;
   a third fiber-optic dispenser connected to a proximal end of the second expendable fiber-optic cable; and
   a fourth fiber-optic dispenser connected to a distal end of the second expendable fiber-optic cable.

18. The unmanned aerial vehicle (UAV) system of claim 17, further comprising a remote controller communicatively coupled to the mobile ground station for receiving and responding to commands and instructions transmitted remotely.

* * * * *